(12) United States Patent
Saha et al.

(10) Patent No.: US 9,092,587 B2
(45) Date of Patent: Jul. 28, 2015

(54) CONGESTION ESTIMATION TECHNIQUES AT PRE-SYNTHESIS STAGE

(71) Applicant: International Business Machines Corporation, Armonk, NY (US)

(72) Inventors: Sourav Saha, Barrackpur (IN); Dilip K. Jha, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/446,536

(22) Filed: Jul. 30, 2014

(65) Prior Publication Data

US 2015/0113488 A1 Apr. 23, 2015

Related U.S. Application Data

(63) Continuation of application No. 14/060,220, filed on Oct. 22, 2013, now Pat. No. 9,009,642.

(51) Int. Cl.
*G06F 17/50* (2006.01)

(52) U.S. Cl.
CPC ........ *G06F 17/5045* (2013.01); *G06F 2217/08* (2013.01); *G06F 2217/82* (2013.01); *G06F 2217/84* (2013.01)

(58) Field of Classification Search
USPC ......................................................... 716/119
See application file for complete search history.

(56) References Cited

U.S. PATENT DOCUMENTS

| 5,600,578 | A | 2/1997 | Fang et al. |
|---|---|---|---|
| 5,784,289 | A | 7/1998 | Wang |
| 6,791,343 | B2 | 9/2004 | Ramarao et al. |
| 6,940,293 | B2 | 9/2005 | Ramarao et al. |
| 7,210,115 | B1 | 4/2007 | Rahim et al. |
| 7,299,442 | B2 | 11/2007 | Alpert et al. |
| 7,428,720 | B2 | 9/2008 | Kanno et al. |
| 7,681,165 | B2 * | 3/2010 | Peters et al. .................. 716/119 |
| 7,714,610 | B2 | 5/2010 | He |
| 7,823,102 | B2 | 10/2010 | Chandra et al. |
| 7,827,510 | B1 | 11/2010 | Schubert et al. |
| 7,992,120 | B1 | 8/2011 | Wang et al. |
| 8,082,137 | B2 | 12/2011 | Li et al. |
| 8,104,006 | B2 | 1/2012 | Kariat et al. |
| 8,356,270 | B2 | 1/2013 | Burd et al. |

(Continued)

OTHER PUBLICATIONS

Alpert, et al., "The Importance of Routing Congestion Analysis", dac.com Knowledge Center Article, May 4, 2010, 14 pages.

Disclosed Anonymously, "Congestion mitigation by Congestion Optimized Library Cell Swapping and Selective Standard Cell Repulsion", An IP.com Prior Art Database Technical Disclosure, Aug. 30, 2012, 10 pages.

Huang, et al., "Compact Thermal Modeling for Temperature-Aware Design", Apr. 2004, pp. 1-17.

(Continued)

Primary Examiner — Eric Lee
(74) Attorney, Agent, or Firm — DeLizio Law, PLLC

(57) ABSTRACT

A method analyzes RTL code to determine congestion of a logic design without completing a synthesis phase of a chip design process. The method can include receiving RTL code, and identifying a statement in the RTL code. The method can include determining that the statement in the RTL code corresponds to a structured device group in a component library, wherein the structured device group includes logic devices configured to occupy an area in a predefined spatial arrangement and with predetermined connectivity between the logic devices. The method can include determining congestion associated with the structured device group by performing operations including determining a congestion figure. The method can also include providing, based on the congestion figure, an indication of the congestion associated with the structured device group.

13 Claims, 6 Drawing Sheets

(56) References Cited

U.S. PATENT DOCUMENTS

| | | |
|---|---|---|
| 8,595,671 B2 | 11/2013 | He |
| 2004/0100286 A1 | 5/2004 | Ramarao et al. |
| 2005/0012509 A1 | 1/2005 | Ramarao et al. |
| 2005/0251775 A1 | 11/2005 | Wood |
| 2007/0164785 A1 | 7/2007 | He |
| 2007/0198971 A1 | 8/2007 | Dasu et al. |
| 2008/0195984 A1 | 8/2008 | Dougherty, et al. |
| 2009/0024969 A1 | 1/2009 | Chandra et al. |
| 2009/0132834 A1 | 5/2009 | Chaudhry et al. |
| 2009/0278564 A1 | 11/2009 | Dehon et al. |
| 2010/0231263 A1 | 9/2010 | Fish et al. |
| 2010/0281448 A1 | 11/2010 | He |
| 2012/0005639 A1 | 1/2012 | Fish et al. |
| 2012/0096424 A1 | 4/2012 | Burd et al. |

OTHER PUBLICATIONS

Krishnamoorthy, et al., "Switching Constraint-driven Thermal and Reliability Analysis of Nanometer Designs", IEEE publication, 2011, 8 pages.

Krishnan, "Temperature and interconnect aware unified physical and high level synthesis", Graduate School Theses and Dissertations., 2008, 232 pages.

Liu, "Power and Thermal Management of System-on-Chip", 2011, 152 pages.

Siozios, et al., "A Power-Aware Placement and Routing Algorithm Targeting 3D FPGAs", Journal of Low-Power Electronics (JOLPE), vol. 4, No. 3, Dec. 2008, 36 pages.

Wei, et al., "Glare: Global and Local Wiring Aware Routability Evaluation", 2012, pp. 768-773.

\* cited by examiner

CONGESTION ESTIMATION TECHNIQUES AT PRE-SYNTHESIS STAGE

RELATED APPLICATIONS

This application is a Continuation of and claims the priority benefit of U.S. application Ser. No. 14/060,220 filed Oct. 22, 2013.

BACKGROUND

The chip design process progresses in phases, such as progressing through system specification phase, architecture design phase, functional and logic design phase, circuit design phase, physical design phase, etc. Chip designers use numerous electronic design tools to progress through each design phase. Some phases are computationally intensive, as they require extensive time and computing resources to complete. Reducing computational complexities in the design process can speed-up chip design and implementation. For example, in the physical design phase, some tools may require completion of a full-blown synthesis analysis to determine whether there are enough resources to layout of a chip's components in a given chip area. That is, some tools perform a full synthesis analysis to determine whether a chip has enough area to place and connect all the devices. Some logic designs require more space than others. Depending on the design complexity and computing resources, such a synthesis analysis may take many hours up to days. If the full-blown synthesis analysis reveals that there is not enough chip space to accommodate the logical design, time spent on the synthesis is lost. Therefore, there is a need for chip design tools that expedite the design process.

SUMMARY

Some embodiments include a method for analyzing register transfer level (RTL) code to determine congestion of a logic design without completing a synthesis phase of a chip design process. The method can include receiving RTL code, and identifying a statement in the RTL code. The method can include determining that the statement in the RTL code corresponds to a structured device group in a component library, wherein the structured device group includes logic devices configured to occupy an area in a predefined spatial arrangement and with predetermined connectivity between the logic devices. The method can include determining congestion associated with the structured device group. The determining congestion can further include determining a routing density score for each logic device of the logic devices, wherein the routing density score is based on signal drive strength of the logic device and number of input and output pins of the logic device. The congestion determination can also include determining a congestion contribution factor of each logic device of the logic devices, wherein the congestion contribution factor is based on distances between the logic device and a first group of the logic devices, and on routing density scores of the first group of the logic devices. The congestion determination can also include determining a congestion figure for the area based, at least in part, on those of the congestion contribution factors for each device exceeding a threshold value and a utilization factor for the area. The method can also include providing, based on the congestion figure, an indication of the congestion associated with the structured device group.

Some embodiments include a method for analyzing RTL code to determine congestion of a logic design without performing a technology dependent synthesis phase of a chip design process. The method can include receiving the RTL code, identifying one or more statements in the RTL code, and determining logic devices needed to implement the one or more statements in the RTL code, wherein the logic devices include combinational devices and sequential devices, and wherein the one or more statements indicate operational requirements of the logic devices. The method can also include identifying locations in the area at which the combinational devices and the sequential devices meet the operational requirements, and placing the combinational devices and sequential devices at the locations in the area at which the combinational devices and the sequential devices meet the operational requirements. The method can also include determining, based on the placing, congestion associated with the area, wherein the determining includes determining a routing density score for each logic device of the logic devices, wherein the routing density score is based on signal drive strength of the logic device and number of input and output pins of the logic device. The method can also include determining a congestion contribution factor of each logic device of the logic devices, wherein the congestion contribution factor is based on distances between the logic device and a first group of the logic devices, and on routing density scores of the first group of the logic devices. The method can also include determining a congestion figure for the area based, at least in part, on a utilization factor for the area, and those of the congestion contribution factors for each device exceeding a threshold value, and providing, based on the congestion figure, an indication of the congestion associated with the area.

BRIEF DESCRIPTION OF THE DRAWINGS

The present embodiments may be better understood, and numerous objects, features, and advantages made apparent to those skilled in the art by referencing the accompanying drawings.

In FIG. 3, a chip 300 includes devices 304 in an area 302, where the devices 304 were taken from a device library.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order more clearly describe embodiments of the invention.

As noted above, some chip design tools perform a full synthesis analysis to determine whether there is enough space to accommodate a chip's devices. That is, some tools must complete a synthesis analysis to layout and connect devices of a logic design. Sometimes, tools cannot layout and connect the devices in given space. As a result, some tools may lose time associated with failed layouts. Some embodiments reduce time necessary for determining whether a chip's devices will fit in a given space by avoiding complex techniques for placing devices on a chip. Instead, some embodiments determine a "rough" placement of the devices in a given area, and estimate congestion associated with connecting the devices in the area. Some embodiments base the congestion estimate on several factors including signal drive strength of each device, pin density, relative proximity of devices, and other factors.

In some instances, device placement is predetermined, so embodiments need not perform the rough placement. That is, in some instances, certain logic design statements (e.g., RTL code) can be implemented using predefined arrangements of devices from a device library. When predefined arrangements are used, embodiments need not arrange the devices in the chip area. Using the predefine arrangement of devices, embodiments can estimate congestion associated with connecting the devices in the area.

This discussion will continue with a discussion of system components that may be used to implement some embodiments of the invention.

Figure 1:
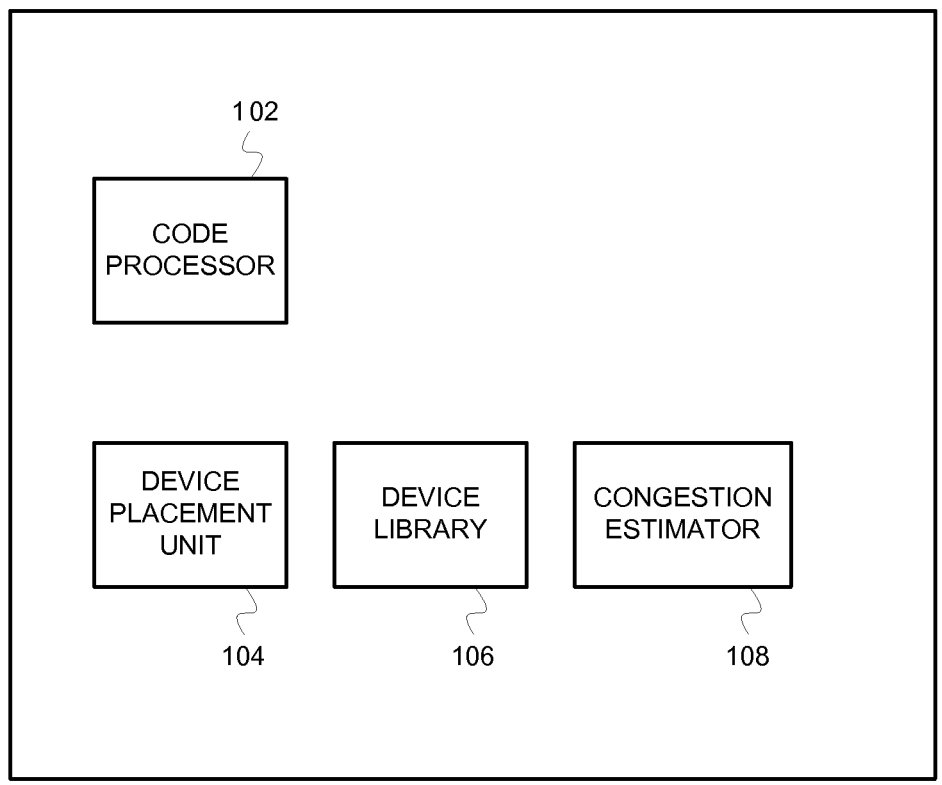
FIG. 1 is a block diagram illustrating components of a chip design tool, according to some embodiments of the inventive subject matter.

FIG. 1 is a block diagram illustrating components of a chip design tool, according to some embodiments of the inventive subject matter. As shown in FIG. 1, a chip design tool 100 includes a code processor 102, device placement unit 104, device library 106, and congestion estimator 108. The code processor 102 can receive and process RTL code. In some embodiments, the code processor 102 identifies RTL statements which define logic that can be implemented using prearranged devices in the device library 106. Additionally, the code processor 102 can identify RTL statements that do not correspond to pre-arrange devices in the device library 106. If the design tool does not use prearranged devices from the device library, the device placement unit 104 can arrange and place the devices in a chip area. The congestion estimator 108 can estimate congestion of devices in an area on the chip, whether they are prearranged from the device library 106 or placed by the device placement unit 104. In some embodiments, the chip design tool 100 can perform the operations described below (see discussion of FIGS. 2-6).

Figure 2:
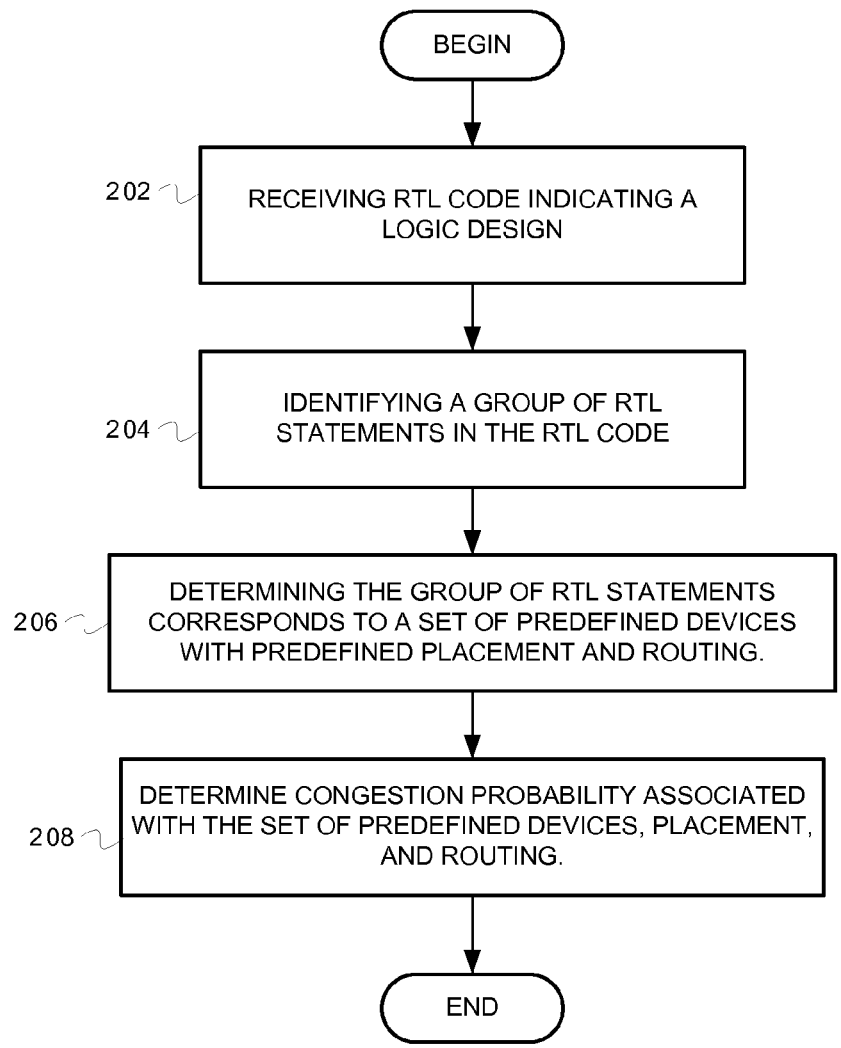
FIG. 2 is a flow diagram illustrating operations for processing RTL code corresponding to a group of predefined devices having predefined routing and layout, according to some embodiments.

FIG. 2 is a flow diagram illustrating operations for processing RTL code corresponding to a group of predefined devices having predefined routing and layout, according to some embodiments. The operations shown in FIG. 1 show how some embodiments process RTL code without performing a full synthesis analysis, and before any technology mapping. That is, some embodiments perform a "high-level" synthesis that determines a design that will likely later result from full synthesis.

At block 202, the code processor 102 receives RTL code indicating a logic design for chip. The flow continues at block 202.

At blocks 204 and 206, the code processor 102 processes the RTL code, and determines that a group of RTL statements corresponds to a set of predefined devices with predefined placement and routing. For example, the code processor 102 determines that a group of the RTL statements defines a 16-bit adder. The code processor 102 further determines that the device library 106 includes a pre-configured 16-bit adder as defined by the RTL statements. The preconfigured 16-bit adder may include any suitable logic devices, such as AND gates, OR gates, inverters, etc. The logic devices have pre-configured layout and connectivity.

Figure 3:
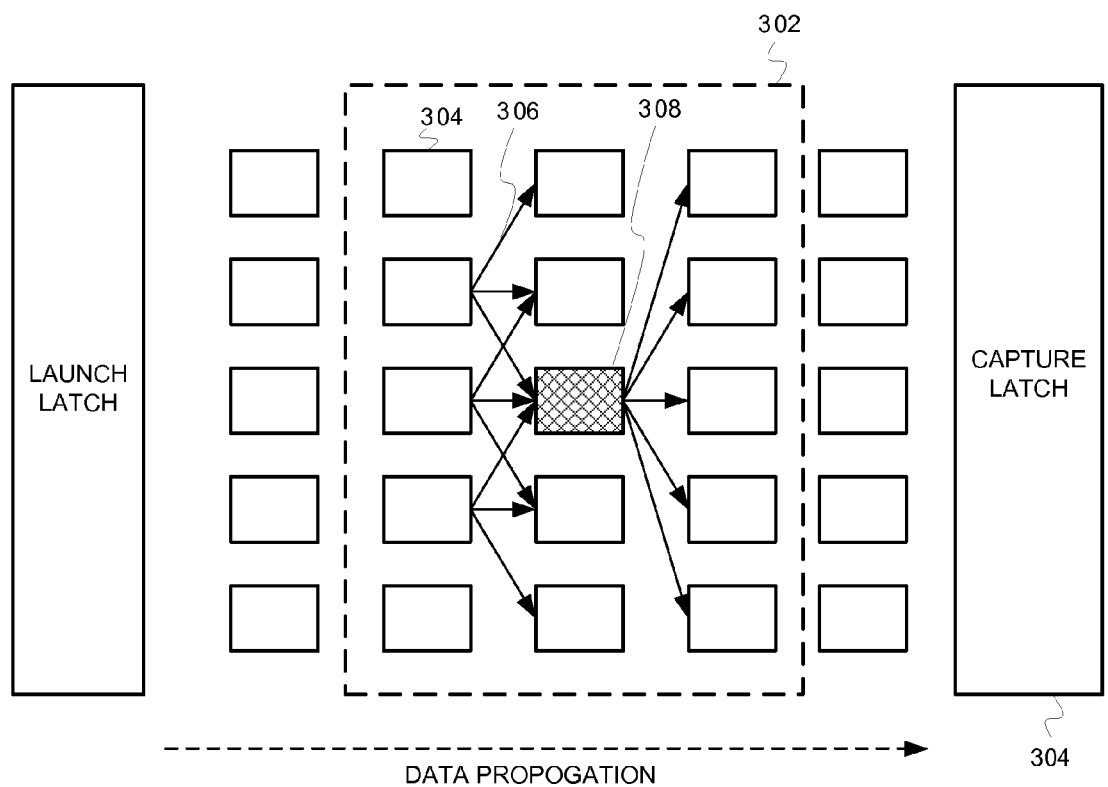
FIG. 3 shows an example of devices found in the device library 106.

FIG. 3 shows an example of devices found in the device library 106. In FIG. 3, a chip 300 includes devices 304 in an area 302, where the devices 304 were taken from a device library. The devices can be any suitable logic devices, such as AND/OR gates, adders, flip-flops, etc. In the device library, the devices have a predetermined layout and connectivity. The devices 304 are integrated with other devices on a chip, as shown in FIG. 3. The connectivity between the devices 304 is preconfigured in the device library (see connections 306). For devices in a given area, where the layout, connectivity, and other information is known, the design tool 100 can estimate congestion. For example, for the area 302, the design tool 100 can estimate congestion. That is, the design tool 100 can determine whether the area 302 is large enough to accommodate all the devices and connections.

Referring back to FIG. 2, the flow 200 may perform the operations at blocks 202-206 multiple times. On successive passes through operations 202-206, the device placement unit 104 integrates all the devices in a chip area.

At block 208, the congestion estimator 108 determines congestion associated with the devices in the chip area. From block 208, the flow ends. Some embodiments determine congestion by: 1) computing a routing difficulty score (RDS) for each device in an area, 2) computing a congestion contribution factor (CCF) for each device based on the RDS of each device, and 3) computing a congestion figure of merit (CFOM) for the area. The following discussion describes how embodiments determine RDS, CCF, and CFOM.

In some embodiments, routing difficulty score (RDS) is a weight given to each standard device of the device library 106 based on how much each device is likely to create difficulty for a router to access all pins of the device. It is a relative weight (e.g., normalized 0 to 100). Typically, RDS is a function of pin density (number of pins in allocated footprint of standard device), size of pins in standard device. For example, NAND4 or NAND3 or AOI22 of very low drive strength (less area foot-print) will be with higher RDS as compared to an INV or NAND2 with very high drive strength. Using this concept, a rank database for all devices in the library can be created, which is made available to congestion estimator 108 for further processing. Some embodiments compute RDS as follows: determine the number of routing tracks availability in the standard device foot print in the input/output pin layer, and divide that number by the total number of pins to be accessed. Some embodiments may consider additional constraints like relative positioning of pins blocking horizontal/vertical access. An example RDS database is shown below in Table 1.

TABLE 1

| Celltype-Drivestrength | Number of Pins (Input + Output) | Example RDS |
| --- | --- | --- |
| INV-drive10 | 2 | 50 |
| INV-drive20 | 2 | 30 |
| NAND2-drive10 | 3 | 60 |
| NAND2-drive20 | 3 | 40 |
| NAND3-drive10 | 4 | 70 |
| NAND3-drive20 | 4 | 50 |
| NAND4-drive10 | 4 | 80 |
| NAND4-drive20 | 4 | 60 |

After determining RDS for each device in the arrangement of devices taken from the device library, the congestion estimator determines a congestion contribution factor (CCF) of each device. Each device's CCF is based on its RDS and RDSs of other devices. Some embodiments determine CCF using the following computation:

$$CCF_k \infty RDS_k * \sum_{j=1, j \neq k}^{n} \left( \frac{RDS_j}{(D_{j,k})^\alpha} \right)$$

$RDS_j$ is the RDS of another device j falling within pre-determined radial distance from device k (irrespective of tile boundary). $D_{j,k}$ is distance between devices j and k. α is an exponential co-efficient (>1) to account for dependency of congestion reduction with increasing separation of high RDS standard cells. Congestion Contribution Factor of an instance has similar dependency with inherent difficulty score of the standard cell from routing accessibility and relative positioning of the instance with reference to other similar congestion prone standard cells. An example Tile representation of a chip is shown in picture below in Table 2.

TABLE 2

| $Tile_{i-1,j+1}$ | $Tile_{i,j+1}$ | $Tile_{i+1,j+1}$ |
| $Tile_{i-1,j}$ | $Tile_{i,j}$ | $Tile_{i+1,j}$ |
| $Tile_{i-1,j-1}$ | $Tile_{i,j-1}$ | $Tile_{i+1,j-1}$ |

After computing the CCF for each device, some embodiments use CCF to determine a congestion figure of merit for a given area.

Congestion figure of merit (CFOM) for a given tile (i.e., chip area) describes a congestion profile of a chip on per-tile basis and helps to understand relative criticality and spread of congestion of a given design. Some embodiments compute CFOM as:

$$CFOM_{Grid(k)} = \frac{\alpha * \sum_{i=1}^{N} CCF_{i > i_{th}}}{N * Area_k * UTIL_k}$$

In the equation above, α is coefficient of congestion adjacency, for example, if adjacent micro grids are equally congested, the value goes up to indicate congestion is more severe in that micro grid.

$CCF_{i>i_{th}}$ indicates only those devices with CCF higher than a threshold limit to be considered. N indicates a number of such devices inside the grid.

$Area_k$ and $UTIL_k$ indicate area and utilization of $K_{th}$ grid.

Acceptable CFOM threshold (beyond which congestion mitigation techniques need to be invoked) and CCF threshold can be determined by studying benchmark designs in a design environment. Eventually, CFOM for a tile can be computed as:

$CFOM(Tile_{i,j}) = Max(CFOM\_Grid_k)$

A tile (i.e., area of a chip) can be internally divided into micro-grids (i.e., smaller areas) for computation of CFOM. Smaller grids account for very localized but significant congestion as well as to account for utilization effectively. Some embodiments can present CFOM values using a color coded matrix, where each matrix cell is colored according to its average CFOM value. For example, red grids may indicate high congestion, whereas other colors indicate lesser congestion.

Figure 4:
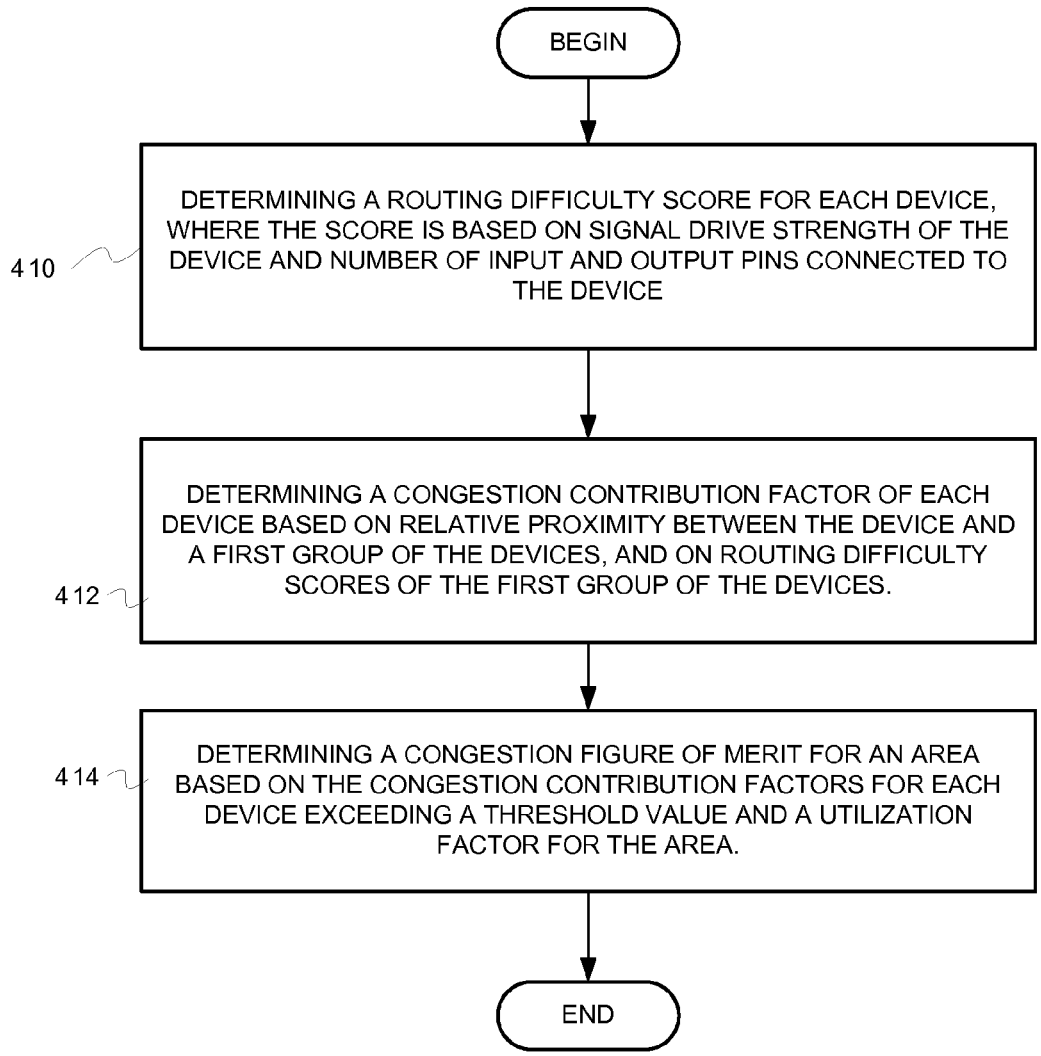
FIG. 4 is a flow diagram illustrating operations for performing a congestion estimation, according to some embodiments.

FIG. 4 shows how some embodiments may employ the computations above. FIG. 4 is a flow diagram illustrating operations for performing a congestion estimation, according to some embodiments. In FIG. 4, the flow 400 begins at block 402, where the congestion estimator 108 determines a routing difficulty score for each device. In some instances, the devices are selected from a device library of prearranged standard devices. In other instances, the device placement unit 104 determines an arrangement of the device. As discussed above, the routing difficulty score may be based on signal drive strength, and number of input/output connected to the device. Some embodiments may determine RDS based on the principles noted above (e.g., see discussion of Table 1). The flow continues at block 404.

At block 404, the congestion estimator 108 determines a congestion contribution factor (CCF) for each device in the area. In some instances, the CCF is based a device's relative proximity to other devices in the area, and on RDSs of those other devices. Some embodiments determine CCF based on the computations noted above. The flow continues at block 406.

At block 406, the congestion estimator 108 determines a congestion figure of merit (CFOM) for a chip area. In some instances, the congestion estimator 108 determines CFOM as described above (see discussion of CFOM above). From block 406, the flow ends.

Figure 5:
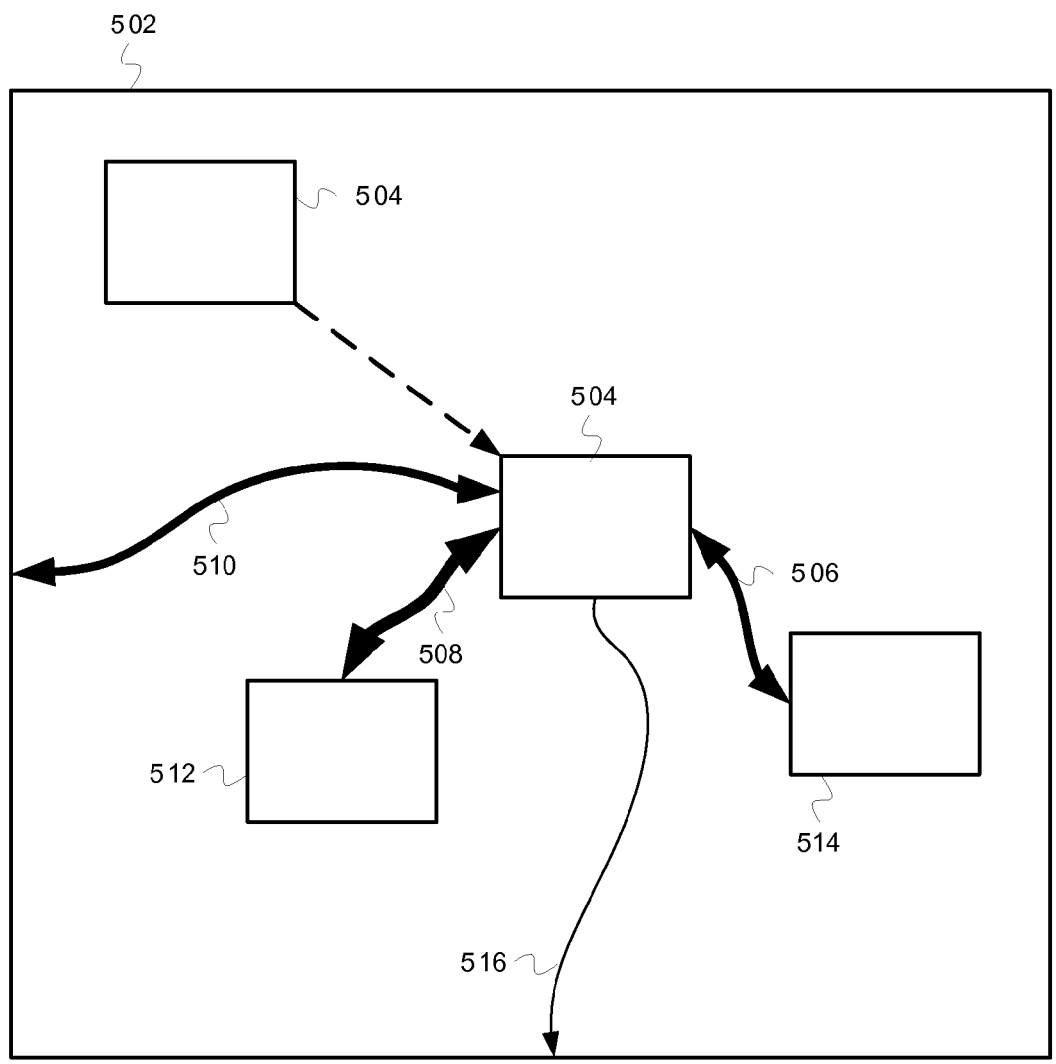
FIG. 5 is a conceptual diagram illustrating placement of devices in a chip area, according to some embodiments.

In the embodiments described above, the chip design tool 100 uses prearranged devices from a device library. However, some embodiments can process RTL statements that require selection and arrangement without using prearranged devices from the device library. In a given design, there are sequential devices, such as flip flops, latches, and combination devices, such as AND gates, OR gates, NOR gates, NAND gates, etc. The RTL code does not indicate where these components should be placed. Therefore, some embodiments of the device placement unit 104 determine where to place these devices in a chip area. After arranging the devices in an area, embodiments can estimate congestion. FIG. 5 describes how some embodiments can place devices in a chip area.

FIG. 5 is a conceptual diagram illustrating placement of devices in a chip area, according to some embodiments. Based on the RTL code, the code processor 102 can determine devices needed to implement a set of RTL code statements. That is, the code processor 102 can determine a number of sequential and combinational devices needed to implement logic define by the RTL code. The device placement unit 104 can formulate a rough estimate about where the devices will be placed in the area to meet the operational requirements on the RTL code statements. In some embodiments, if the elements are placed relatively far apart, congestion will likely be low. Otherwise, congestion may be high. In some embodiments, the rough placement follows optimization/operational factors affecting placement of latch bank: timing, power, noise, cross talk, etc.

FIG. 5 shows a chip area 502 that includes latch banks 504, 512, and 514. The arrows 506 and 508 represent connections between the latch banks 504, 512, and 514. In FIG. 5, the arrow thickness indicates the number of connections, where thicker arrows represent more connections between latch banks. The arrows 510 and 516 represent connectivity to latch banks outside the area 502.

Some embodiments can place latch-banks using a "sliding window" analysis. That is, some embodiments can arrive at a first-pass location for latch-banks by analyzing relative location with connected latch-banks or Pin-in/Pin-out, as the case may be. Using the sliding window analysis, the device placement unit can move devices around an area until most of the operational criteria are met. For example, consider a signal that originates at a Q-pin (output pin) of a flip flop, where the signal is received after four stages of combinational logic. The device placement unit may not initially place the intermediate combinational devices. Embodiments place the flip flop at an arbitrary location in the area, and slide it within a 5 micron area until the operational criteria are met. Referring to FIG. 5, the latch bank 504 begins in the upper right corner of the area 502, and is moved to the central region of the area 502 (see dotted arrow). Embodiment can continue moving the latch bank 504 until it resides in a location where the operational requirements are met.

After the latch banks have been placed, the device placement unit can perform a logic depth analysis for each logic cone (out-bound or in-bound) connected to each latch bank. A logic depth map for a small group of combinational gate along with pin density data is an indicative metric of packing/clustering of device (high utilization). The following two equations represent a relationship between utilization/congestion, logic depth, and timing budget.

Utilization Efficiency=$F$(Logic depth, Timing Budget, FO4 delay, Interconnect delay look-up table)

Congestion Probability=$F$(Utilization Efficiency, Pin Density)

The following paragraphs describe the parameters noted in the equations above.

Utilization Efficiency—When determining utilization efficiency, the area can be subdivided into a grid. For example, the area 502 may divided into 10 by 10 grid, and devices occupy 70 of the gird areas. Thus, there is have 70% utilization. There can be high utilization but low pin density, so connecting the devices is not relatively difficult. On other hand, if pin density increases, then making connections may be harder.

Timing Budget—Timing budget is an amount of time from when a device receives a signal to when the next device must receive the signal. If budget is small, devices may have to be very close together. The devices can be further apart as the timing budget grows. As described, actual routing has not occurred, only a rough routing estimate has occurred.

FO4 delay—Fan Out delay—every device in the library has a FO4 delay assigned to it.

Interconnect Delay—The chip will include a stack of connective layers, and every layer has a delay associated with it. Depending on which layer is used to connect devices, there is a delay associated with a signal traveling over a given distance through the layer (e.g., the delay may be 20 picoseconds per 1 micron segment of the layer).

After arranging the devices in an area, embodiments can estimate congestion. After embodiments compute Utilization Efficiency and Congestion Probability, pin density of devices is known, and so is the position of the device. Using pin density and device position, embodiments can determine RDS and CCF for each device. Using RDS and CCF, embodiments can calculate CFOM for an area.

Figure 6:
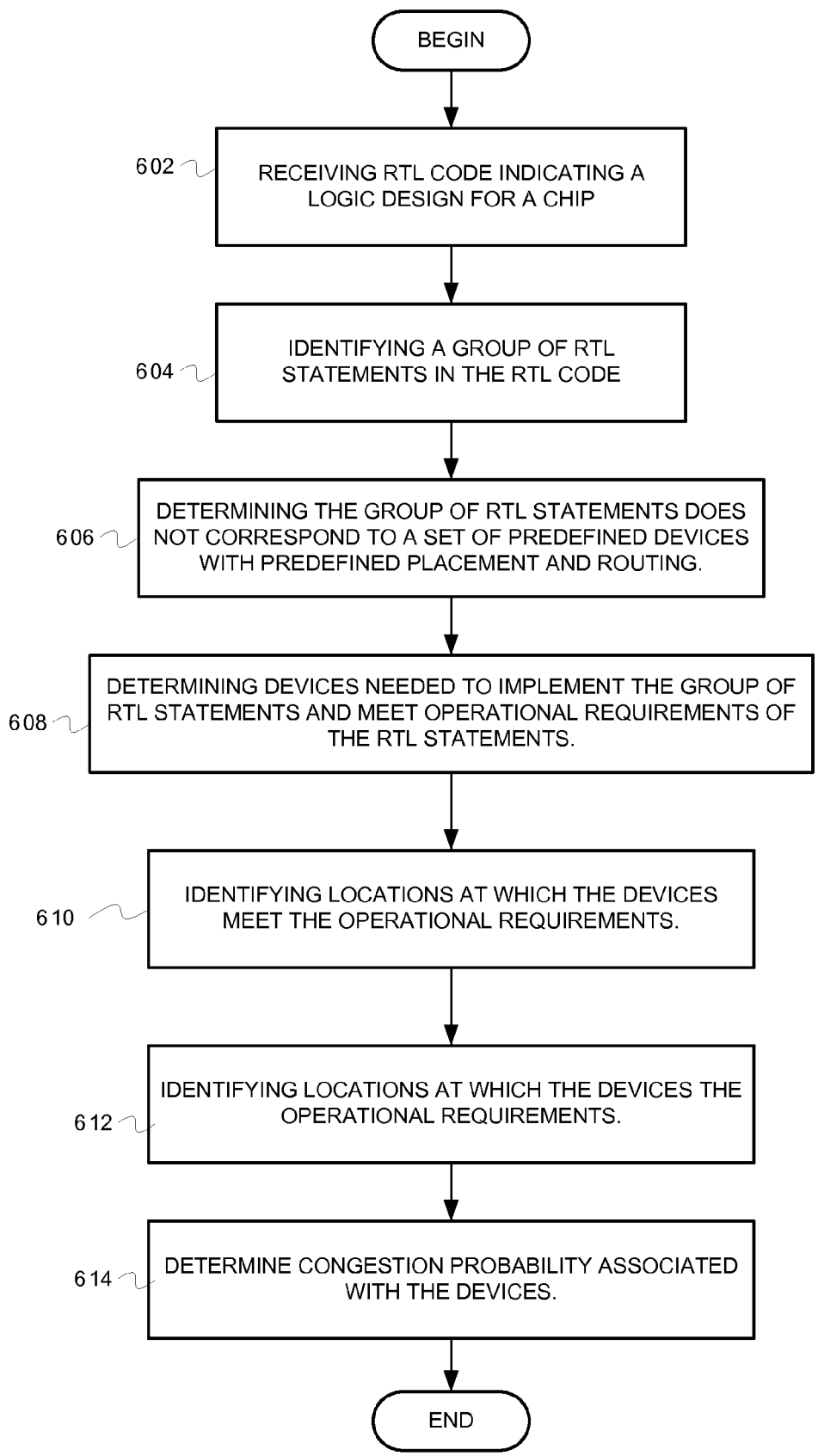
FIG. 6 is a flow diagram illustrating operations for placing devices in a chip area and estimating congestion associated with those devices, according to some embodiments.

The discussion of FIG. 6 explains how some embodiments can place devices associated with RTL code (e.g., as described in FIG. 5), and estimate congestion associated with those devices.

FIG. 6 is a flow diagram illustrating operations for placing devices in a chip area and estimating congestion associated with those devices, according to some embodiments. At block 602, the code processor 102 receives RTL code indicating a logic design for chip. The flow continues at block 604.

At block 604, the code processor 102 identifies a group of RTL statements in the RTL code. The flow continues at block 606. At block 606, the code processor determines that the group of RTL statements does not correspond to a set of preconfigured devices from the device library 106. The flow continues at block 608.

At block 608, the device placement unit 104 determines devices to implement the group of RTL statements, and meet operational requirements of the RTL statements. The flow continues at block 610.

At block 610, the device placement unit 104 places the devices in a chip area, where the placement meets operational requirements in the RTL statements (e.g., see discussion of FIG. 5). The flow continues at block 612.

At block 612, the congestion estimator 108 determines congestion associated with the devices. In some embodiments, the congestion estimator 108 estimates congestion by performing the operations described in FIG. 4. From block 612, the flow ends.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the embodiments are described with reference to various implementations and exploitations, it will be understood that these embodiments are illustrative and that the scope of the inventive subject matter is not limited to them. In general, techniques for estimating congestion of a chip design may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for analyzing register transfer level (RTL) code to determine congestion of a logic design without completing a synthesis phase of a chip design process, the method comprising:
   receiving RTL code;
   identifying, by at least one processor of a computer, a statement in the RTL code;
   determining, by the at least one processor of the computer, that the statement in the RTL code corresponds to a structured device group in a component library, wherein the structured device group includes logic devices configured to occupy an area in a predefined spatial arrangement and with predetermined connectivity between the logic devices; and
   determining, by the at least one processor of the computer, congestion associated with the structured device group, wherein the determining includes:
      determining a routing density score for each logic device of the logic devices, wherein the routing density score is based on signal drive strength of the logic device and number of input and output pins of the logic device,
      determining a congestion contribution factor of each logic device of the logic devices, wherein the congestion contribution factor is based on distances between the logic device and a first group of the logic devices, and on routing density scores of the first group of the logic devices,
      determining a congestion figure based, at least in part, on the congestion contribution factor of each logic device of the logic devices, and
      providing, based on the congestion figure, an indication of the congestion associated with the structured device group.

2. The method of claim 1 further including:
   graphically presenting the indication of the congestion associated with the structured device group.

3. The method of claim 1 further comprising:
   selecting the structured device group from a plurality of structured device groups, wherein the structured device group and the plurality of structured device groups perform a same functionality but include different logic devices, wherein the selecting is based on one or more parameters associated with the statement in the RTL code, the one or more parameters including at least one of timing, signal strength, and area optimization.

4. The method of claim 1 further comprising:
   determining, based on the congestion figure, that congestion associated with the structured device group exceeds an acceptable level; and
   selecting a different structured device group from the component library, after determining that the congestion associated with the structured device group exceeds the acceptable level.

5. The method of claim 1 further comprising:
   determining, based on the congestion figure, that congestion associated with the structured device group exceeds an acceptable level; and
   rearranging the logic devices to a different spatial arrangement in the area.

6. The method of claim 5, wherein the rearranging is performed to a sliding window protocol.

7. The method of claim 1, wherein the structured device group includes one or more of a latch, a flip flop, and an adder.

8. The method of claim 1, wherein the providing includes presenting a color code depiction of the structured device group, wherein color codes indicate congestion.

9. A method for analyzing register transfer level (RTL) code to determine congestion of a logic design without performing a technology dependent synthesis phase of a chip design process, the method comprising:

receiving the RTL code;

identifying, by at least one processor of a computer, one or more statements in the RTL code;

determining, by the at least one processor of the computer, logic devices needed to implement the one or more statements in the RTL code, wherein the logic devices include combinational devices and sequential devices, and wherein the one or more statements indicate operational requirements of the logic devices;

identifying, by the at least one processor of the computer, locations in an area at which the combinational devices and the sequential devices meet the operational requirements;

placing, by the at least one processor of the computer, the combinational devices and the sequential devices at the locations in the area at which the combinational devices and the sequential devices meet the operational requirements;

determining, by the at least one processor of the computer, based on the placing, congestion associated with the area, wherein the determining includes:

determining a routing density score for each logic device of the logic devices, wherein the routing density score is based on signal drive strength of the logic device and number of input and output pins of the logic device;

determining a congestion contribution factor of each logic device of the logic devices, wherein the congestion contribution factor is based on distances between the logic device and a first group of the logic devices, and on routing density scores of the first group of the logic devices;

determining a congestion figure based, at least in part, on the congestion contribution factor of each logic device of the logic devices; and providing, based on the congestion figure, an indication of the congestion associated with the area.

10. The method of claim 9, wherein the combinational devices are placed between the sequential devices to propagate signals between the combinational devices, and where the method further comprises:

determining logic depth of the combinational devices; and determining pin density of the sequential devices and the combinational devices.

11. The method of claim 9, wherein the operational requirements indicate one or more of signal timing requirements of the logic devices, noise constraints of the logic devices, and crosstalk constraints of connections between the logic devices.

12. The method of claim 9 further comprising:

after the placing and before the determining of the congestion, determining utilization efficiency of the area, wherein the utilization efficiency is based on logic depth, fan-out delay, and timing budget of the logic devices.

13. The method of claim 9 further comprising:

determining, based on the congestion figure, that congestion in the area exceeds an acceptable level; and moving one or more of the logic devices to other locations in the area.

\* \* \* \* \*